Nov. 2, 1965 R. N. WATTS 3,215,783

AUTOMATIC CONNECTION LINE CIRCUIT

Filed Nov. 22, 1961

2 Sheets-Sheet 1

INVENTOR
R. N. WATTS
BY
SE Hollander

AUTOMATIC CONNECTION LINE CIRCUIT

Filed Nov. 22, 1961 2 Sheets-Sheet 2

INVENTOR
R. N. WATTS
BY S. E. Hollander
ATTORNEY 3,215,783
Patented Nov. 2, 1965

3,215,783

AUTOMATIC CONNECTION LINE CIRCUIT

Robert N. Watts, Westfield, N.J., assignor to Bell Telephone Laboratories, Incorporated, New York, N.Y., a corporation of New York Filed Nov. 22, 1961, Ser. No. 154,180
5 Claims. (Cl. 179—18)

This invention relates to telephone systems and more particularly to an automatic connection line circuit for use therein.

A communication service which is attractive to many telephone subscribers is that of completing a communication path between a calling party and one of a predetermined group of called parties with a minimum expenditure of time and effort on the part of the originator. Repertory dialing schemes have been designed for this purpose. The first circuits of this type were of the kind wherein the subscriber controls the automatic dialing of a preselected group of directory numbers. The automatic dialing equipment is located on the subscriber premises and the operation of a particular one of a plurality of keys causes a particular series of pulses to be transmitted to the local central office control or switching equipment. Such repertory dialers are also provided with means for enabling the subscriber to dial normal calls as well as repertory calls.

More recent and advantageous repertory services are those wherein the repertory dialing equipment is located at the central office. In these systems, the subscriber dials a predetermined one or two digit code. The central office equipment detects these digits and translates them into a full directory number. The central office then operates upon this full seven (or more) digit number. In such systems, although extra equipment is not required at the subscriber location, the subscriber must still wait for dial tone and dial one or two digits. The only saving in time and effort results from the fact that the subscriber need not dial another five or more digits. Means are also provided with these repertory dialing services for enabling the subscriber to initiate normal calls.

A communication service which seems attractive to certain classes of data and business customers is that of connecting a subset at one location to a subset at another with no effort other than the lifting of a handset by the subscriber. An example of this type of traffic is the airline reservation office in which the clerks must clear each reservation with a central office or agency. Another example is a stock market quotation system where the lifting of a handset would automatically connect a broker to a particular quotation center. Such an automatic connection circuit would enable the originating party to be connected only with one particular location. However, the calling party need lift only his handset for this connection to be established. He need not be supplied with dial tone as no digits need be dialed. The subscriber merely lifts his handset and the next sound he hears is the ringing of the called party.

Such an automatic connection line circuit offers numerous advantages. In addition to precluding calls to unauthorized substations by clerks or other employees, a minimum of time and effort need be expended by them in the performance of their duties. Such an automatic connection line circuit is also advantageous from the point of view of the operating company. As contrasted with more recent repertory dialers, no detection equipment must be provided for translating the repertory one or two digit code dialed by the subscriber. A most advantageous circuit would be one which would require minimum additional equipment and minimum modification of existing central offices in order to accommodate the new service.

It is an object of this invention to provide an improved automatic connection line circuit for use in a telephone system.

It is another object of this invention to provide an automatic connection line circuit requiring a minimum expenditure of time and effort on the part of the originator.

It is another object of this invention to provide an automatic connection line circuit having a minimum complexity and easily adaptable to existing telephone control or switching equipment.

The illustrative embodiment of the invention is disclosed adapted to a No. 5 crossbar system. Such a system is disclosed in detail in Patent 2,585,904, of A. J. Busch, issued February 19, 1952. In this and similar systems the digits ordinarily dialed by the subscriber are stored in an originating register. To the originating register are directed not only the called number but the customer line location, class of service and other pertinent information to be passed to the marker circuit. When the necessary information is stored in the originating register, the originating register requests a connector to connect it to a completing marker in order that the call be established.

In accordance with one aspect of this invention, the removal of his handset by the subscriber and the energization of the associated line relay does not cause the connection of a dial tone marker and originating register to the subscriber line as in conventional operation. Rather, the operation of this relay energizes particular leads in an automatic connection line circuit which is connected to a connector. These leads are so arranged that their energization by the operation of the line relay notifies the connector to seize a marker as well as providing the connector with all the information that would normally be obtained from an originating register servicing the particular calling and called parties involved. The connector seizes a marker and the call proceeds in the normal fashion. Dial tone is not provided to the calling party as the line relay does not seize a dial tone marker. This step as well as the sequence involving an originating register are not required in the establishment of a call. Almost no effort need be expended by the originator. A minimum of additional equipment is required at the central office location. And as to be described hereinbelow, minimum modification is required of the central office equipment.

A feature of this invention is to provide means for operating an automatic connection line circuit in response to the energization of a subscriber's line relay.

It is another feature of this invention to provide means for bypassing an originating register in the establishment of an automatic connection call.

It is another feature of this invention to provide means in the automatic connection line circuit for simulating the information normally passed from the originating register to an originating register marker connector relating to a particular pair of calling and called parties.

It is still another feature of this invention to provide means for adapting an automatic connection line circuit to a telephone system in such a manner that the automatic connection line circuit functions with an originating register marker connector in the same manner as an originating register.

Further objects, features, and advantages of the invention will become apparent upon consideration of the following description, taken in conjunction with the drawing, wherein.

Figure 1:
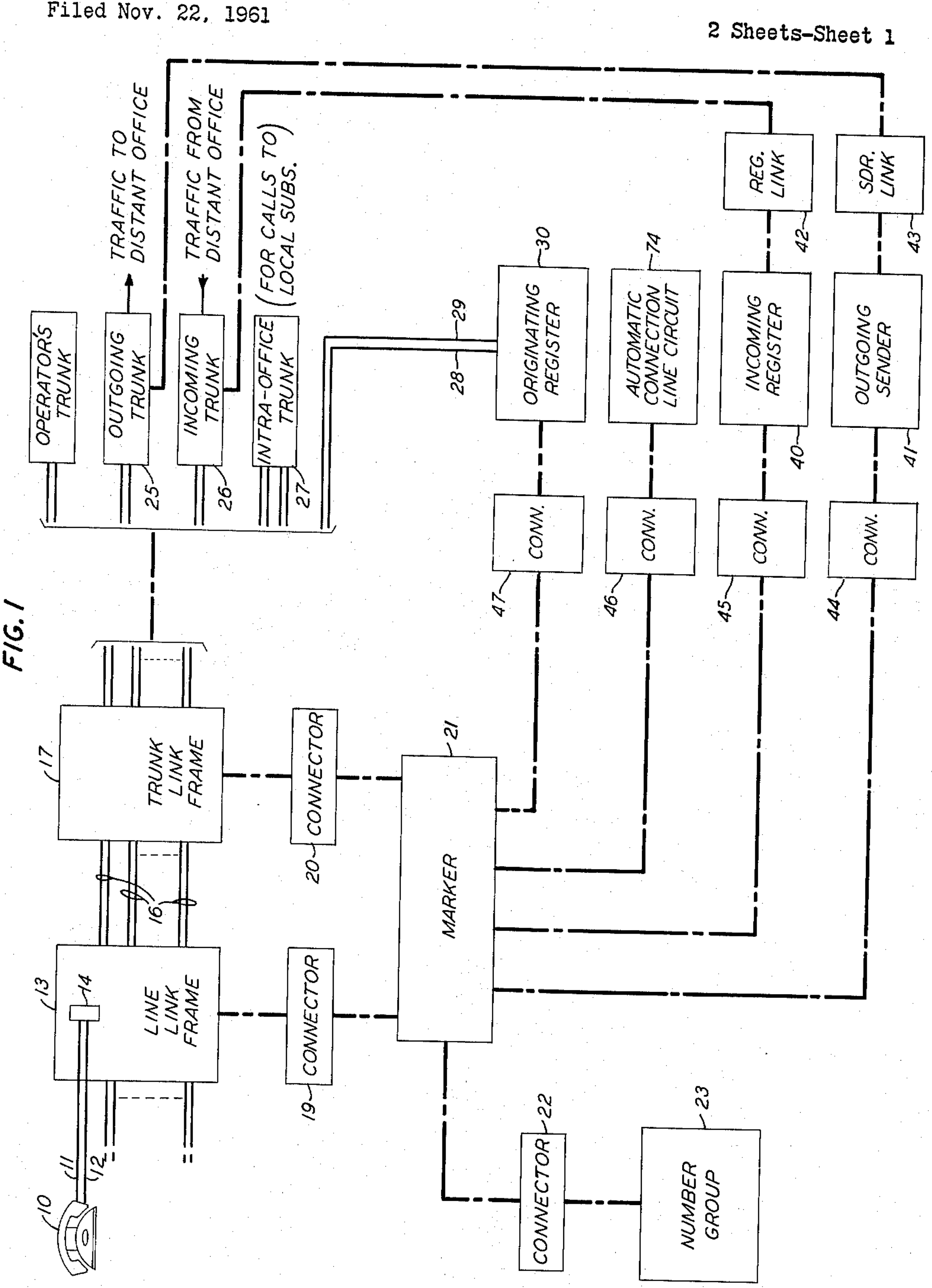
FIG. 1 is a block diagram of the telephone system in which the illustrative embodiment of the invention is employed.

In order to fully comprehend the invention, a brief summary of the operation of a No. 5 crossbar central office will be of aid. Referring to FIG. 1, a conventional office comprises all the elements shown except connector 46 and the automatic connection line circuit 74. Each subscriber line, comprising a subset 10 and tip and ring conductors 11 and 12, appears on a line-link frame 13. Although only tip and ring conductors are shown it is understood that they are accompanied by the conventional sleeve or control conductor. The line has but a single appearance on the line-link frame, this serving both originating and terminating calls. Every connection is set up from a trunk or a register to a calling or a called line through crossbar switches on trunk-link 17 and line-link 13 frames, these two frames being connected by a plurality of conductor pairs 16. The common control equipment which is used to set up the various connections includes markers, such as marker 21; connectors, such as connectors 19, 20, 22, 44, 45 and 47; number groups, such as number group 23; senders and registers, such as registers 30 and 40, and sender 41; and various register and sender links, such as links 42 and 43. Once a talking path is established, all control elements are released and only the line-link, trunk-link, and trunk circuit elements remain in the connection.

Before any talking path is set up, all needed information on calling and called parties is registered in a way which enables a marker in a uniform and flexible manner to call into the connection only those switching, signaling, transmission and supervisory features required for the particular call. The lifting of the handset by the subscriber causes his line relay 14 to be energized. The energization of the line relay normally notifies connector 19 to connect the subscriber line to a marker 21. The marker then controls a connection of an originating register 30 to the subscriber line. This connection is effected through line-link frame 13, a conductor pair 16, trunk-line frame 17 and a conductor pair 28 and 29. The connection is established by control signals from the marker 21 through connectors 19, 20 and 47. Dotted lines in FIG. 1 represent control signal paths. The marker establishes a connection of the tip and ring conductors 11 and 12 to conductors 28 and 29.

On every subscriber call, the marker obtains the particular calling party, class of service, etc. information. It then places this information in the seized originating register 30 via connector 47. The marker then disconnects itself from the line-link and trunk-link frames and the originating register, and the subscriber proceeds to dial the called number which is stored directly in the originating register 30. When all of the needed information on calling and called parties is stored in the originating register, a marker is again engaged for a fraction of a second to establish the talking connection. Knowing both ends of the connection required, the marker then sets up the call with the best combination of elements.

If the call is to another subscriber in the same office, the marker connects an idle intra-office trunk circuit 27 to the calling and called lines.

If the call is to a destination outside the office, the marker recognizes this from the information dialed and proceeds to connect the calling line to an outgoing trunk circuit 25 in the proper group. If a sender 41 is needed, the marker connects one of the appropriate type to the trunk circuit 25 through a sender link 43. A sender receives information from the marker and transmits it in the form of pulses to registers, other senders, or directly to switches as required in the systems of the connecting offices. This information includes the subscriber's numerical digits and may include office code digits as well. Since senders must be capable of operating with the standard kinds of signaling, four types are available for dial-pulse, revertive-pulse, multifrequency-pulse, and panel call-indicator operation.

If the call is incoming from another office, the incoming trunk circuit 26 associates itself with an incoming register 40 through an incoming register link 42. The incoming registers receive information from senders, dials, or key sets in the distant offices and pass this information to the markers for establishing a connection either to a called subscriber line in the same office, or to a distant office when through switching of toll or tandem traffic is involved. Incoming registers, like senders, must be capable of operating with the standard kinds of signaling; hence there are dial-pulse, revertive-pulse, multifrequency-pulse, and B-switchboard registers.

For a comprehensive description of this circuitry reference may be made to the above-identified A. J. Busch patent.

Figure 2:
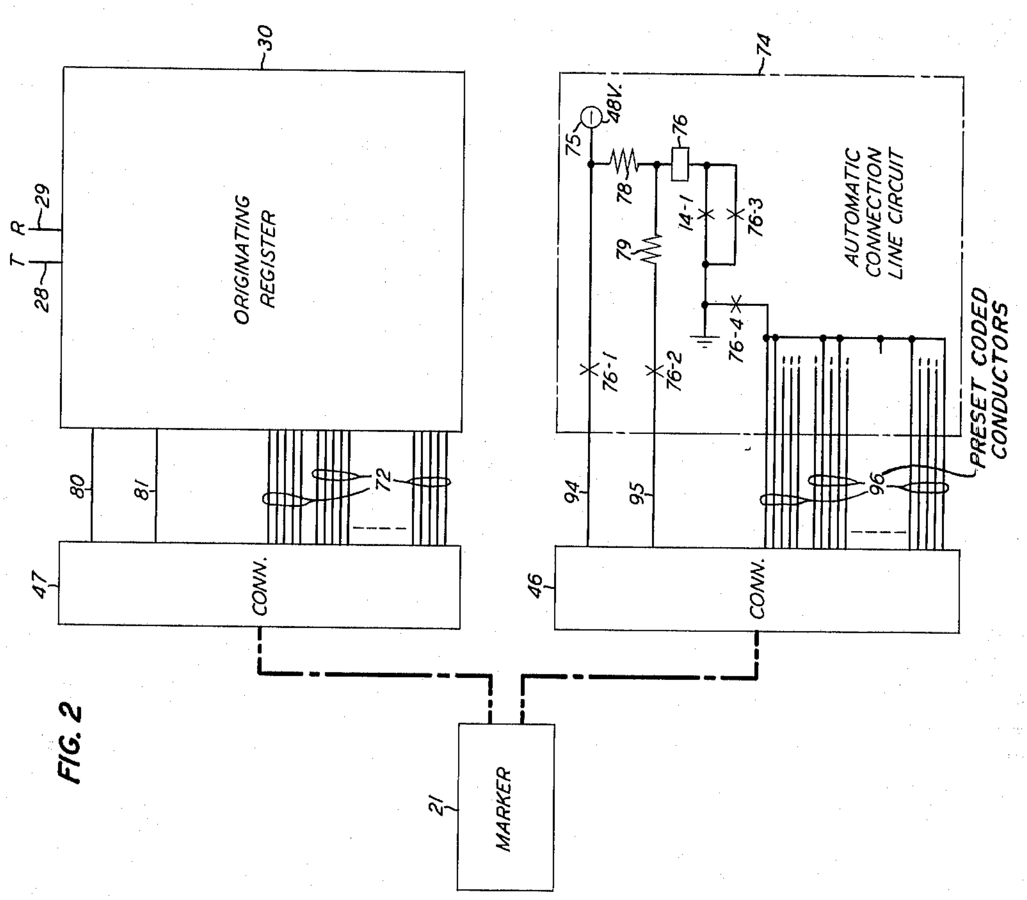
FIG. 2 is a more detailed diagram of certain parts of the system of FIG. 1.

Referring to FIG. 2 the various leads connecting originating register 30 to a connector 47 are shown in greater detail. Conductor 80 has applied to it a negative 48-volt potential when all of the necessary information is stored within originating register 30. It is this conductor which controls the seizing of connector 47 and the connection of the originating register 30 to the marker 21. When all of the necessary switching information is contained within originating register 30, the 48-volt potential is applied to conductor 80. This potential not only seizes connector 47 but in addition is the source of power for operating the connector.

Conductor 81 is similarly connected to connector 47. It should be noted that although conductors 80 and 81 are shown as single conductors, these conductors may in fact be multiple connections. Conductor 81 is utilized by the marker through the connector 47 for releasing the originating register 30 from the marker after the latter has processed the information contained within originating register 30. After the marker has digested the information, a ground potential is applied through connector 47 to conductor 81 which releases originating register 30.

A plurality of groups of conductors 72 connect the originating register 30 to connector 47. Two conductors in each group of five are normally grounded for each call processed. All information stored in an originating register is on a two-out-of-five basis and consequently when the originating register has stored in it all of the requisite switching information and a negative 48 volt potential is applied to conductor 80 for seizing connector 47 and a marker, two out of each group of five conductors are grounded.

Referring back to FIG. 1, the automatic connection line circuit 74 of the invention is shown connected to marker 21 through a connector 46. Connectors 46 and 47 are identical and thus for the automatic connection line circuit 74 to be compatible with the system the same control signals passed between originating register 30 and connector 47 must be passed between the automatic circuit 74 and connector 46. In FIG. 2 the conductors 94–96 connecting the automatic circuit 74 and connector 46 to each other shown in detail, these conductors being analogous to conductors 80, 81 and 72 connecting originating register 30 to connector 47.

When the line relay 14 in the line-link frame 13 operates in response to the lifting of his handset by the subscriber, contacts 14–1, shown in FIG. 2, close. Current flows from the negative source 75, through register 78, the coil of relay 76, and now-closed contacts 14–1 to ground. Relay 76 operates and closes contacts 76–1, 76–2, 76–3 and 76–4.

The closing of contacts 76–1 places the negative 48-volt potential of source 75 on conductor 94. This seizes connector 46 in a manner identical to the seizure of connector 47 by the originating register 30 when a 48-volt potential is applied to conductor 80. In a similar manner, the 48-volt potential supplies the operating power for connector 46.

Similarly, when contacts 76–2 close, conductor 95 connects connector 46 to the automatic connection line circuit 74. When the marker, through the connector 46, applies ground potential to conductor 95 after the marker has digested the information supplied by the automatic connection line circuit, the automatic connection line circuit releases in a manner to be described hereinbelow.

It is seen that in each plurality of preset coded conductors 96, only two of the five conductors are connected to ground through contacts 76–4. Conductors 96 are connected to connector 46 in a manner similar to the connection of the analogous conductors 72 from originating register 30 to connector 47. Consequently, when the negative potential on conductor 94 seizes the connector 46, two out of five conductors in each group 96 connected to connector 46 are grounded and the call is set up in the normal fashion.

Contacts 76–3 are in shunt with contacts 14–1. Contacts 76–3 are latching means for enabling relay 76 to remain operated even after the line relay 14 releases and contacts 14–1 open.

After the marker has operated upon the information represented by each pair of grounded conductors in the groups 96, the marker applies a ground potential through connector 46 to conductor 95. Resistor 78 is much greater in magnitude than resistor 79 and consequently the junction of these two resistors is at this time at approximately ground potential. When the ground potential is applied to conductor 95, no current flows through the coil of relay 76. This relay releases and contacts 76–1 through 76–4 open. The automatic connection line circuit is thus disconnected from connector 46 and remains unoperated until line relay 14 again operates in response to the same subscriber desiring to call the same predetermined called party.

Figure 3:
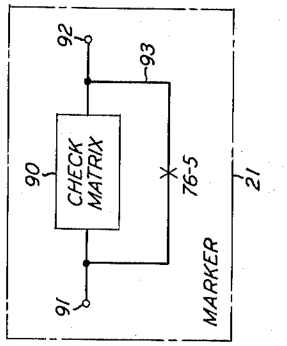
FIG. 3 shows a slight modification of the No. 5 central office required for the automatic connection line circuit of the invention to be compatible with the No. 5 crossbar system.

It is thus seen that the line relay 14 directly causes the seizure of a completing marker. The steps of providing dial tone and the dialing of the called number into the originating register 30 are completely avoided. Two minor modifications of the local central office are required. Normally, the operation of the line relay controls contacts which connect an originating register 30 to the subscriber line and in addition cause the application of dial tone. These contacts need merely be removed from the central office equipment in order that an originating register 30 not be seized by the operation of the line relay. Also in the course of setting up a call, the marker expects to receive from the originating register the number of the line-link used for the dial tone connection. Since no such connection is made in the course of setting up an automatic connection call, the marker check on this number must be disabled. The line-link number in a conventional call is transmitted on a two-out-of-five basis along some of conductors 72 connected to an originating register. As a line-link is not used in operating the automatic connection line circuit the analogous ones of conductors 96 in FIG. 2 are not grounded. To disable the marker check on these conductors the line-link check matrix in the marker of a No. 5 central office need merely be short-circuited. This may be accomplished advantageously by providing a conductor containing normally open contacts controlled by relay 76 in parallel with the check matrix. When relay 76 operates a two-out-of-five check is automatically simulated. Referring to FIG. 3, in the normal operation of a marker terminals 91 and 92 are electrically connected through check matrix 90 only if two of the five conductors representing the line-link used are grounded. In those offices where the automatic connection line circuit of the invention is incorporated conductor 93 is added in parallel wtih check matrix 90. When relay 76 operates, terminals 91 and 92 are electrically connected and the two-out-of-five check is simulated.

It is thus seen that a call may be set up between two particular parties with a minimum expenditure of time and effort. The calling party need only lift his handset to initiate the call. No detecting equipment need be provided as in prior art repertory dialing schemes. A minimum amount of additional circuitry is required as seen from FIG. 2. It should be noted that calls to the subscriber provided with an automatic connection line circuit may be made in the normal fashion and are in no way affected by the automatic connection line circuit.

Although the invention has been described with a certain degree of particularity, it is to be understood that the present disclosure has been made only by way of example and that numerous changes and variations in the combination and arrangements of component elements may be resorted to without departing from the spirit and scope of the invention.

What is claimed is:

1. An automatic connection line circuit for a telephone central office, said central office including marker means, originating register means, first connector means for normally connecting said originating register means to said marker means, and means controlled by said marker means for enabling said originating register to receive the necessary calling and called party information for setting up a call, said automatic connection line circuit comprising second connector means, information storage means connected to said second connector means having stored therein the necessary information for setting up a call between a particular pair of calling and called substations, and means controlled by said calling substation going off-hook for transmitting said stored information from said storage means through said connector means to said marker means.

2. An automatic connection line circuit for a telephone central office for governing the connection of a particular calling substation to a unique called substation comprising switching means for establishing a connection between calling and called substations, relay means responsive to said particular calling substation going off-hook, a plurality of conductors connected to said switching means arranged in a predetermined coded pattern for representing the necessary switching information pertaining to a connection between said particular calling substation and said unique called substation, and means controlled by said relay means for applying a signal on said conductors to transmit to said switching means information in accordance with said predetermined coded pattern.

3. An automatic connection line circuit for establishing a connection between particular first and second subscribers responsive to said first subscriber going off-hook comprising first relay means responsive to said first subscriber going off-hook, second relay means responsive to said first relay means, switching means for establishing a connection between calling and called subscribers, and means responsive to the operation of said second relay means for transferring to said switching means predetermined information pertaining to said particular first and second subscribers, said transferring means comprising a plurality of conductors connected at one end to said switching means and at the other end to a source of reference potential and means for normally maintaining the connections open and for closing them responsive to the operation of said second relay means.

4. An automatic connection line circuit for connecting a telephone calling substation in a crossbar telephone system to only a unique called substation, said telephone system having a marker and an originating register, said automatic connection line circuit comprising means for bypassing said originating register, said bypassing means including relay means responsive to said calling substation going off-hook, a plurality of conductors arranged in a coded pattern connected to said marker representing all of the switching information pertaining to said calling substation and said unique called substation, and means responsive to said relay means for applying a signal on said plurality of conductors.

5. A telephone central office having a marker circuit, originating register means, means for connecting a calling substation served by said marker circuit to said originating register means for enabling said calling substation to dial digits representing a called substation into said originating register means, and connector means for connecting said originating register means to said marker circuit responsive to the completion of the dialing of said digits by said calling substation, said marker circuit establishing a connection between said calling substation and the called substation represented by said digits responsive to the connection of said originating register means to said marker circuit characterized by an automatic connection line circuit for automatically connecting said calling substation to only a single called substation without requiring the dialing of any digits by said calling substation comprising relay means responsive to said calling substation going off-hook, information transmitting means containing therein predetermined information relating to said unique called substation, and means for controlling the connection of said information transmitting means to said marker circuit and for operating said information transmitting means responsive to the operation of said relay means.

References Cited by the Examiner

UNITED STATES PATENTS 2,261,243 11/41 Flint ................ 179—27

ROBERT H. ROSE, *Primary Examiner.*

THOMAS B. HABECKER, *Examiner.*